United States Patent [19]

Ledjeff

[11] 4,394,423

[45] Jul. 19, 1983

[54] CLOSURE DEVICE FOR LEAD-ACID BATTERIES

[76] Inventor: Konstantin Ledjeff, Schwalbach, Fed. Rep. of Germany, granted to U.S. Department of Energy under the provisions of 42 U.S.C. 2182

[21] Appl. No.: 307,000

[22] Filed: Sep. 29, 1981

[30] Foreign Application Priority Data

Dec. 3, 1980 [DE] Fed. Rep. of Germany ....... 3045480

[51] Int. Cl.$^3$ .............................................. H01M 2/12
[52] U.S. Cl. ......................................... 429/86; 429/89
[58] Field of Search ...................... 429/86, 89, 121, 57

[56] References Cited

U.S. PATENT DOCUMENTS

| | | | |
|---|---|---|---|
| 2,615,062 | 10/1952 | Craig .................................... | 136/179 |
| 3,038,954 | 6/1962 | Pattison et al. ...................... | 136/179 |
| 3,630,788 | 12/1971 | Hennen ............................. | 429/86 X |
| 3,832,238 | 8/1974 | Marui et al. ......................... | 429/86 |
| 3,879,227 | 4/1975 | Hennen ................................ | 429/86 |
| 4,002,496 | 1/1977 | Nitta .................................... | 429/53 |
| 4,084,039 | 4/1978 | Laig-Hörstebrock ................ | 429/89 |
| 4,117,205 | 9/1978 | Kitai .................................... | 429/86 |

FOREIGN PATENT DOCUMENTS 1024589  1/1978  Canada .

Primary Examiner—Charles F. Lefevour
Attorney, Agent, or Firm—Hugh W. Glenn; Robert J. Fisher; Richard G. Besha

[57] ABSTRACT

A closure device for lead-acid batteries includes a filter of granulated activated carbon treated to be hydrophobic combined with means for preventing explosion of emitted hydrogen and oxygen gas. The explosion prevention means includes a vertical open-end tube within the closure housing for maintaining a liquid level above side wall openings in an adjacent closed end tube. Gases vent from the battery through a nozzle directed inside the closed end tube against an impingement surface to remove acid droplets. The gases then flow through the side wall openings and the liquid level to quench any possible ignition prior to entering the activated carbon filter. A wick in the activated carbon filter conducts condensed liquid back to the closure housing to replenish the liquid level limited by the open-end tube.

4 Claims, 1 Drawing Figure

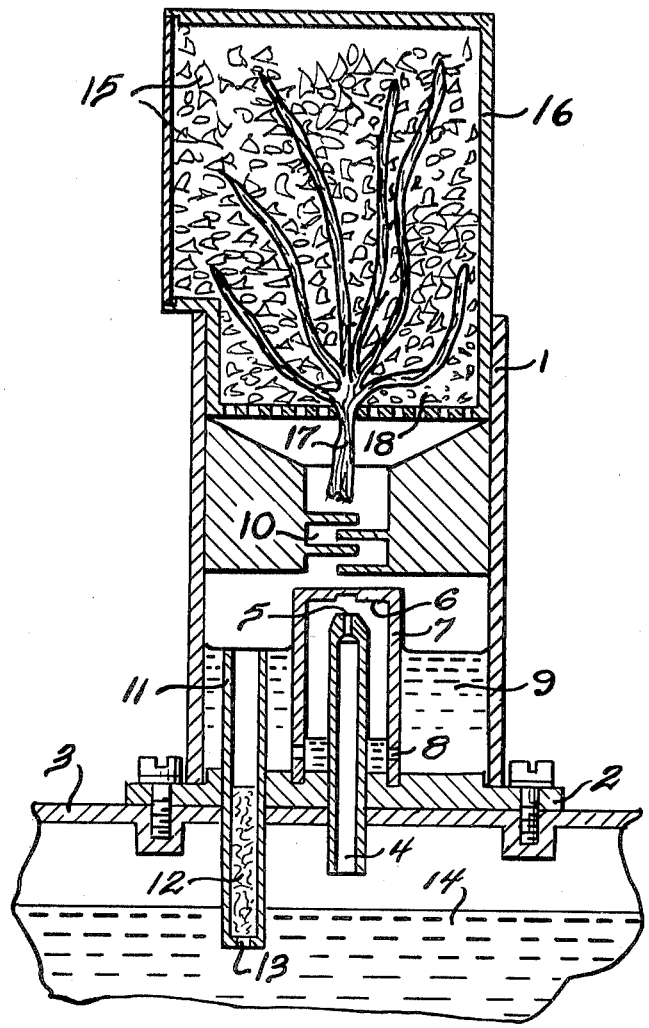

CLOSURE DEVICE FOR LEAD-ACID BATTERIES

CONTRACTUAL ORIGIN OF THE INVENTION

The United States Government has rights in this invention pursuant to Subcontract No. 31-109-38-4438 with Varta Batterie AG under Contract No. W-31-109-ENG-38 between the U.S. Department of Energy and the University of Chicago.

BACKGROUND OF THE INVENTION

The present invention relates to closure devices for lead-acid batteries. More particularly, it relates to those that incorporate activated carbon within a filter or catalytic device for the removal of poisons from the battery discharge gases.

The electrode grids of lead-acid electrochemical cells are produced from lead alloys that contain antimony or arsenic. Under certain conditions during use of the lead-acid battery, antimony hydride and arsenic hydride gases are produced and discharged. In addition to these poisonous gases, hydrogen and oxygen gas are also emitted during operation of the lead-acid electrochemical cell. As an illustration of a poisonous effect of $SbH_3$ and $AsH_3$ on the respiratory organs, a typical maximum concentration permitted in a work place is about 0.05 ppm for $SbH_3$ and about 0.1 ppm for $AsH_3$.

In a lead-acid battery grid that includes 1.6% by weight antimony in the lead alloy, a gas discharge can contain about 4 mg $SbH_3$ per 100 liters of gas. For such a discharge, at least 100 fold air dilution is required to reduce this antimony content to a safe level. The extent of this problem is illustrated in that a typical submarine employing lead-acid storage batteries may develop about 1500 liters per hour gas discharge and in such an environment it is always possible that the maximum admissible concentration of these poisonous gases may be exceeded.

It is possible to catalytically decompose $SbH_3$ and $AsH_3$ by using CuO or $PbO_2$. A process of this type as shown in Canadian Pat. No. 1024589. It has also been found that these poisonous hydrogen compounds can be removed through use of an activated carbon filter.

A filter plug of activated carbon may be damaged or destroyed by explosions that can occur within the head space of the lead-acid secondary cell from the accumulation of hydrogen and oxygen gases. In addition, the activated carbon can lose its effectiveness if it becomes wetted with water. Even if the activated carbon is made hydrophobic, the acid droplets which escape from the electrochemical cell or storage battery will during the course of time destroy the hydrophobic coating.

One other representative publication in this field is U.S. Pat. No. 4,084,039 entitled "Gas Venting Battery Plug" to Helmut Laig-Horstebrock. The device disclosed in this patent includes a nozzle directed toward an impingement plate for removing fine droplets of acid from the discharge gas flow. A return passage including a porous and wettable material extends into the storage battery for return of condensed liquid droplets but with sufficient hydrostatic head to prevent bypassing of gas discharge. However, a device of this type is without protection from explosions that may result in the discharge gas.

SUMMARY OF THE INVENTION

Therefore, in view of the above it is an object of the present invention to provide an improved closure device for a lead-acid storage battery that permits discharge of gases while protecting against destruction or damage by explosion.

It is a further object to provide a closure device for a lead-acid battery that removes toxic antimony and arsenic gases from the gas discharge while providing protection from the risk of explosion.

It is also an object of the present invention to provide a closure device for a lead-acid battery that is capable of removing acid droplets from vented discharge gas, reduce the discharge of poisonous gaseous hydrides in combination with protecting against the risk of damage or destruction by explosion of reactive gases.

In accordance with the present invention a closure device for lead-acid batteries is presented. The device includes a filter of activated carbon in combination with means for preventing explosions attached to the gas vent opening of the lead-acid battery.

In more specific aspects of the invention, there is also included an impingement means whereby acid droplets within the discharge gases are removed.

In further aspects, the activated carbon filter includes granulated activated carbon with a wick having a plurality of branches in contact with the activated carbon granules and having a trunk portion extending from the activated carbon filter. Further, the activated carbon granules are treated with a hydrophobic material.

In another important aspect of the invention, the explosion prevention means includes an overflow for maintaining a level of liquid at a location through which the discharge gases from the storage battery are passed. The passageway for discharge of the gases includes a nozzle with an inlet at the storage battery opening extending to a constricted discharge directed toward a solid impingement surface. The impingement surface is part of a closed-end tube aligned around the nozzle. The closed-end tube has side wall openings for gas discharge at an end portion opposite to the impingement surface. An open-end vertical tube outside the closed-end tube has its upper end at a level above the side wall openings in the closed-end tube but below the constricted discharge of the nozzle. The open-end tube is provided with a porous medium of wettable material in its lower end portion positioned in communication with and at least partially immersed in the acid electrolyte within the storage battery.

BRIEF DESCRIPTION OF THE DRAWINGS

The FIGURE shows a cross-sectional elevation view of a closure device mounted on the top of a storage battery.

DETAILED DESCRIPTION OF THE PREFERRED EMBODIMENT

In the FIGURE a closure device for a secondary lead-acid storage battery is shown. The device includes a housing 1 that is connected to the upper closure wall or removable lid 3 of the storage battery by means of bottom plate 2. A vertical gas inlet tube 4 extends upwardly through the battery lid 3 and bottom plate 2 into a chamber defined within a closed-end tube 7. The upper end of tube 4 is constricted to form a nozzle 5 directed towards the closed end 6 of tube 7. The closed end 6 of tube 7 thereby acts as an impingement surface to remove acid droplets from the discharge gases emitted from nozzle 5. This principle is more completely described in U.S. Pat. No. 4,084,039 cited above.

Tube 7 is provided with side wall openings 8 in its lower end portion opposite to its closed end and is sealingly joined at this lower end portion to bottom plate 2. A vertical open-end tube 11 outside of closed-end tube 7 also passes through battery lid 3 and bottom plate 2 upwardly to a level within housing 1 below that of nozzle 5 but above side wall openings 8 of tube 7. Tube 11 thus serves as a limit to the level of liquid 9 contained in the lower portion of housing 1 and permits return of excess liquid 9 to the storage battery.

The discharge gases from the storage battery pass from tube 7 through the side wall openings 8 at the lower portion of tube 7 and through liquid 9 in the form of bubbles. The gas then flows to the upper portion of the closure device through a labyrinth 10 for the further removal of acid droplets.

The level of liquid 9 acts as a device for preventing the spread of an explosion that may originate in the storage battery head space or in the closure device housing 1. The height of liquid 9 is defined by the upper opening of tube 11 and is below the level of nozzle 5 but above the level of side wall openings 8.

The lower portion of tube 11 is provided with a porous filling medium 12 that is connected by a constricted passage 13 into communication with the acid electrolyte 14 of the storage battery. The porous filling medium 12 is a material wettable by the electrolyte that thus imparts a hydrostatic pressure within the lower part of tube 11 that is always greater than the pressure in the gas inlet tube 4. Medium 12 can be such as polyethylene, polypropylene or other wettable material as given in U.S. Pat. No. 4,084,039. Discharge of gases is further sealed from entering liquid return tube 11 by immersing its end portion below the surface of the battery electrolyte 14.

Poisons are removed from the discharge gases by means of an activated carbon filter in the upper portion of the closure device. This filter includes activated carbon 15 preferably in granular form that is made hydrophobic by previous treatment with a hydrophobic material such as polytetrafluroethylene dispersion. The activated carbon is provided by known methods such as the destructive distillation of vegetable matter or other carbonaceous material under controlled conditions to provide a highly active material with large specific surface area. For purposes of this application the term "activated carbon" is intended to include activated charcoal, activated coal and other activated carbonaceous material.

The activated carbon is advantageously contained in a housing 16 mounted on lower housing 1. A wick 17 having a plurality of branch portions in contact with the granulated activated carbon can terminate in a lower trunk portion that extends through the bottom 18 of the filter housing 16. The wick may consist of a polyester material for conducting moisture from the filter of activated hydrophobic carbon downward through labyrinth 10 to supplement the liquid 9 within the lower portion of housing 1. Additional openings through bottom 18 enhance liquid drainage. Thus, wick 17 advantageously maintains the level of liquid 9 and ensures its explosion prevention capability. Since the electrolyte 14 within the battery cell will be at a higher temperature than the surrounding environment during recharging, water vapor will continuously be generated for condensation within the activated carbon filter 15 thus providing a continuous fluid return to replenish the level of liquid 9.

It is therefore seen that the present invention provides an improved closure device for a lead-acid battery. The device advantageously combines means for explosion prevention, removal of poisonous gases and acid droplets from the discharge gases of a lead-acid storage battery. Although not shown, the device can advantageously be used in combination with a second device for recombining hydrogen and oxygen gases generated during recharge of the secondary lead-acid storage battery. Alternatively, these explosive gases can be diluted to safe concentrations following removal from the battery closure device. Such gases can be removed through a suitable vent, not shown.

Although the present invention is described in terms of specific materials, processes and technique, it will be clear to one skilled in the art that various modifications can be made in accordance with the invention described in the accompanying claims.

The embodiments of this invention in which an exclusive property or privilege is claimed are defined as follows:

1. A closure device for attaching to a lead-acid battery for removing poisons from gases produced and discharged during battery use, comprising the combination of a filter of activated carbon and means for preventing explosion, said means for preventing explosion comprises a nozzle having an inlet communicating with a passageway from said battery and a constricted discharge for gases directed towards an impingement surface, a closed-end tube disposed around said nozzle and having a closed end forming said impingement surface, said closed-end tube having a side-wall opening for gas discharge at an end portion opposite to said impingement surface and an open-end vertical tube outside said closed-end tube, said open-end tube having an open upper end at a level above said side wall openings in said closed-end tube but below said constricted discharge of said nozzle and below said filter of activated carbon to provide means for maintaining a liquid level through which said gases must pass, said open end tube having a porous medium of wettable material in its lower end portion for positioning in communication with and at least partially below the surface of acid electrolyte within said battery.

2. A closure device for a storage battery comprising the combination of:
a housing connected to the storage battery, said housing defining a chamber for containing a liquid level;
filter means for removing toxic discharge gases from said battery in gas flow communication with said housing chamber, said filter means including liquid conducting means for returning condensed water vapor to said housing chamber; and
liquid-gas contact means for preventing explosion within said housing, said liquid-gas contact means including the combination of an inverted closed-end tube communicating with an outlet for discharge gases from said battery and a generally vertical open-end tube within said housing chamber, said closed-end tube having a side-wall opening at its lower end portion for permitting gas flow into said housing chamber, said open-end tube having a lower end portion with means for forming a liquid seal blocking gas flow positioned in liquid flow communication with said storage battery and an upper end portion positioned within said housing chamber above the level of said side-wall openings in said closed-end tube whereby a liquid level is maintained through which gas discharge from said battery must pass and whereby excess condensed liquid is returned to said battery through said open-end tube.

3. The device of claim 2 wherein said closed-end tube comprises impingement means at its upper closed end for removing liquid droplets from said discharge gases.

4. The device of claim 2 wherein said filter means comprises granulated activated carbon treated with a hydrophobic material and there is included in contact therewith a wick for conducting moisture from said activated carbon into said housing chamber.

* * * * *